Patented June 29, 1948

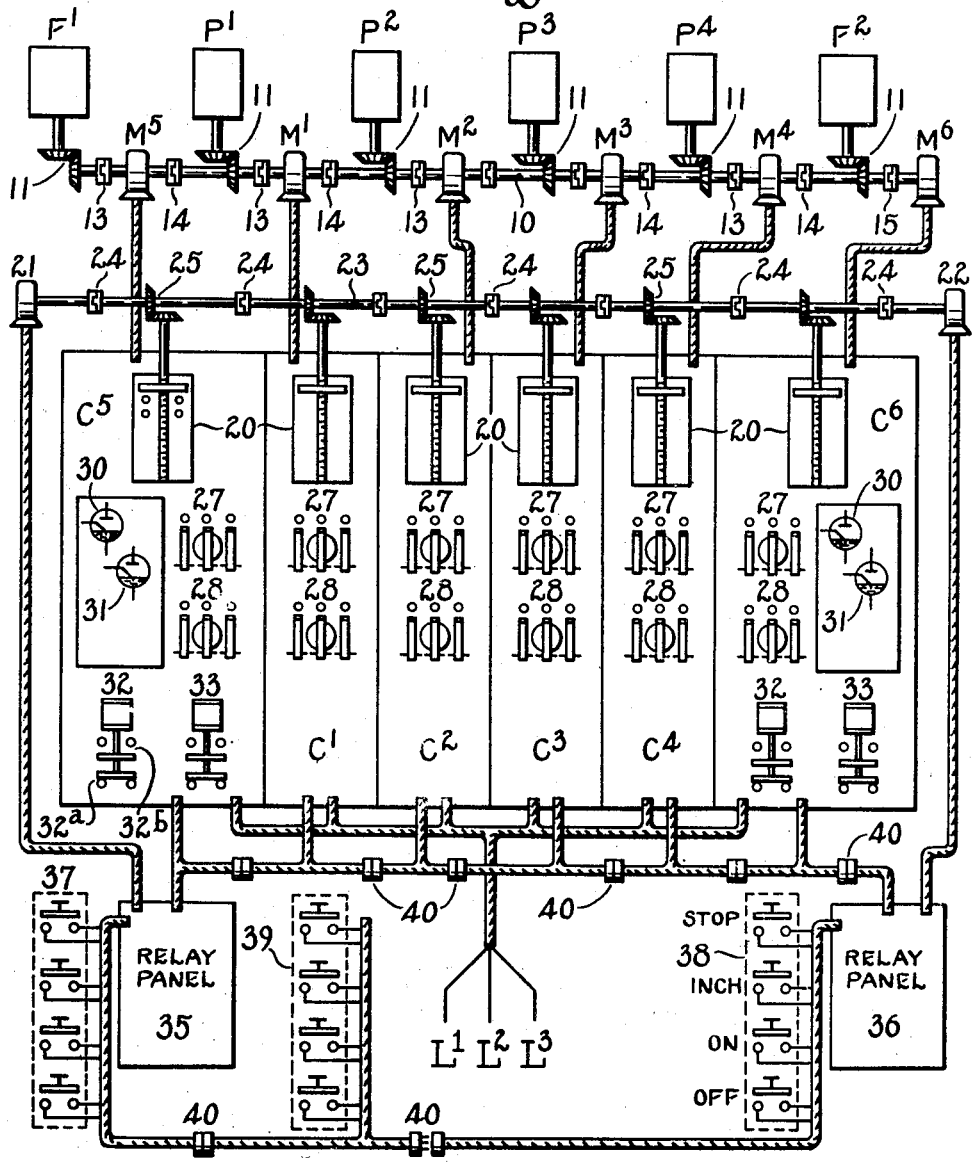

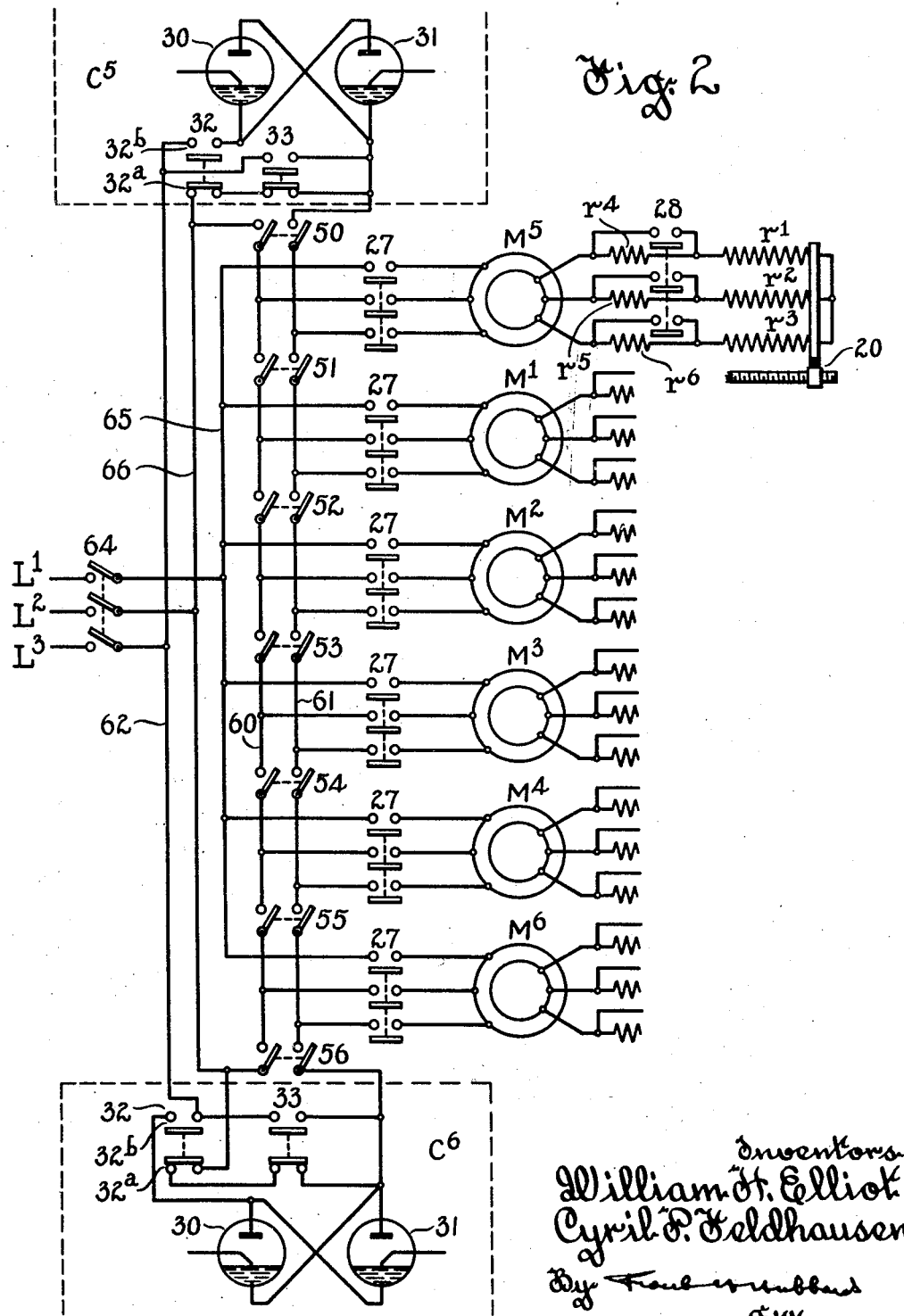

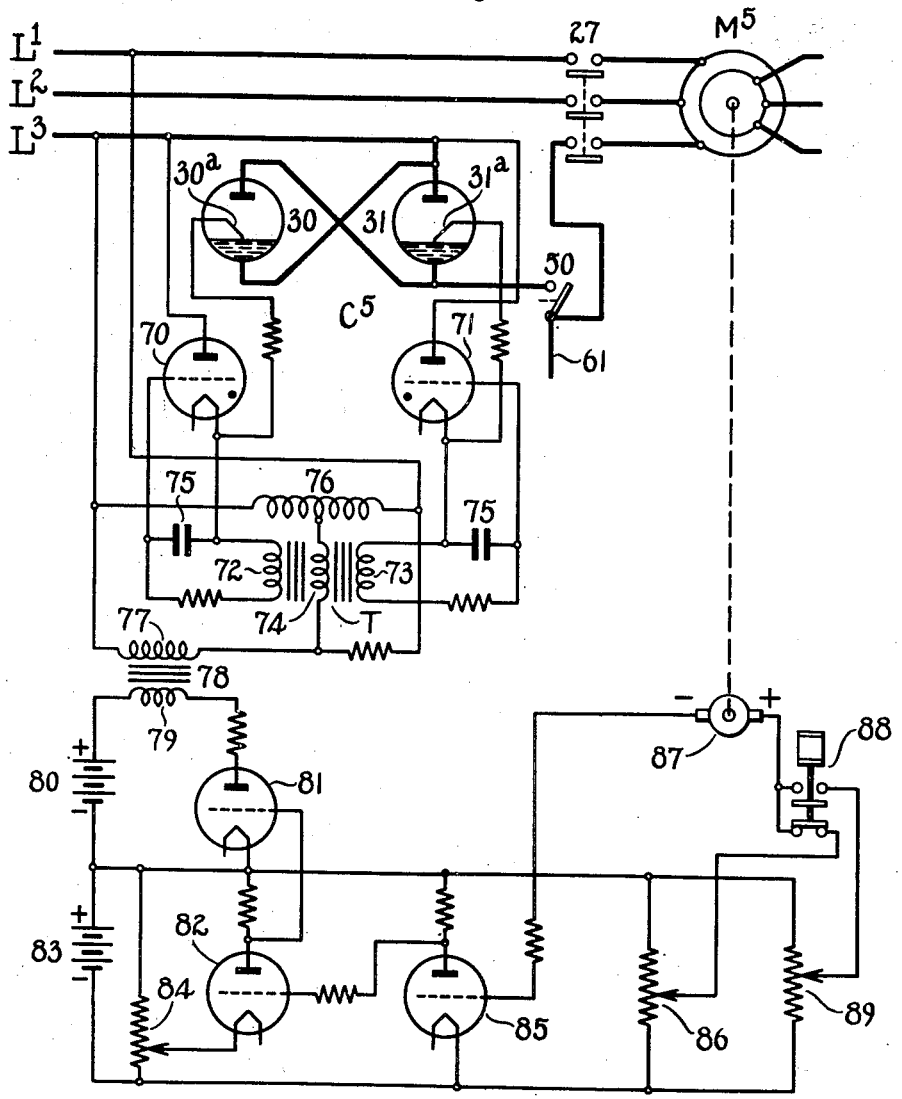

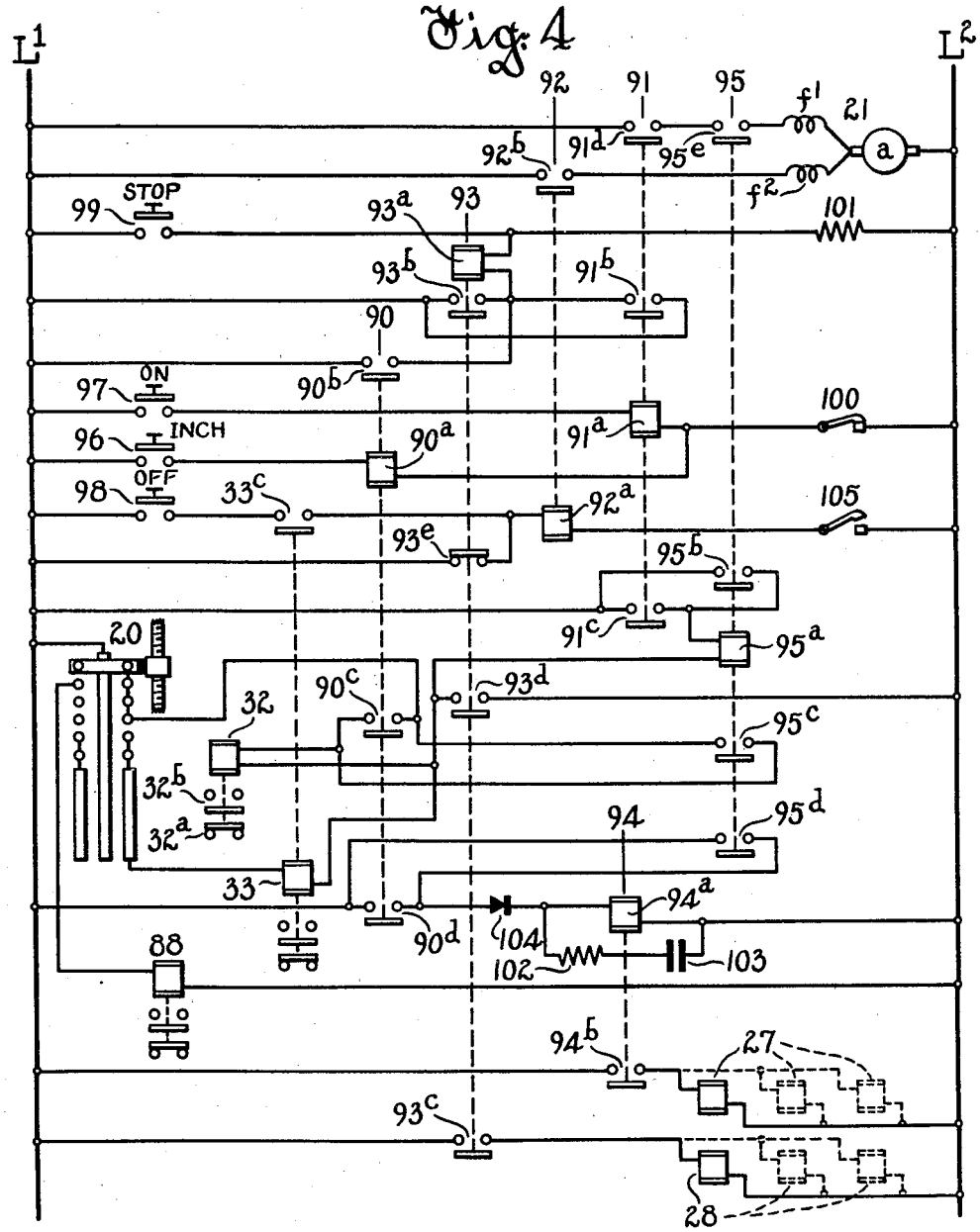

2,444,186

UNITED STATES PATENT OFFICE 2,444,186

CONTROL FOR PRINTING PRESSES AND OTHER MOTOR-DRIVEN MACHINES

William H. Elliot, Shorewood, and Cyril P. Feldhausen, Wauwatosa, Wis., assignors to Cutler-Hammer, Inc., Milwaukee, Wis., a corporation of Delaware Application December 23, 1946, Serial No. 718,074

20 Claims. (Cl. 318—443)

1

This invention relates to control for printing presses and other motor driven machines.

More particularly the invention relates to controllers for motor driven machines comprising units, as for example printing presses comprising printing units and folders, having individual motor drives and commutatable mechanical interconnections to provide for different groupings of the units with the units of each group mechanically interconnected to insure operation thereof in unison.

In the copending application of W. H. Elliot, Serial No. 587,245, filed April 9, 1945, there is disclosed a single motor drive for a printing press and control therefor which in part is of the electronic type and which affords press drive by the single motor at the desired running speeds, or alternatively at slow constant speed suitable for inching and/or threading, and the present invention has among its objects to extend such control to motor driven machines of the aforementioned multiunit type having individualized driving motors to be controlled in different groups according to the groupings of the units.

Another object is to minimize the control apparatus individualized to each of the units and to enable a group of driving motors to be controlled for slow speed by control means common thereto.

Another object is to provide multiunit control comprising in part electronic control means, which electronic control means may be common to all motors of a group of driven units.

Another object is to provide a printing press system wherein the individualized controls for the folders comprise all of the slow speed electronic control apparatus required by the group or groups of press units and folders, thus enabling the controls individualized to the printing units to be reduced to the means for obtaining the desired running speeds.

Another object is to provide a system wherein the control panels for the folders may be alike and wherein the simpler control panels for the printing units may be alike.

Another object is to provide for a multiunit motor driven machine commutatable control means wherein the circuits requiring commutation for different groupings of the driven units are simple, and may be controlled through the medium of simple and reliable switching means.

Another object is to provide commutatable control means of the aforementioned character which additionally provides for braking of the driven units by self-braking action of their driving motors.

2

Another object is to provide commutatable control means for a multiunit driven machine, which control means includes a set of push button switches for each press unit to effect full control of it and the units mechanically interconnected therewith, such full control including control through the medium of the slow speed control means common to all of the mechanically interconnected units.

Another object is to afford the motors of each group selective slow speeds under the control of the electronic means.

Various other objects and advantages of the invention will hereinafter appear.

The accompanying drawing illustrates schematically and diagrammatically one embodiment of the invention which will now be described, it being understood that the embodiment illustrated is susceptible of various modifications without departing from the scope of the appended claims.

In the drawing,

Figure 1 shows schematically a printing press comprising a plurality of printing units and folders having individualized single motor drives and also shows control panels individualized to the press units, together with relay panels for control of pilot motors utilized to operate speed regulating devices on the control panels under the control of push button stations;

Fig. 2 shows diagrammatically power circuits of the several driving motors of the press, electronic means to be included in certain of the power connections for slow speed, and switches controlling power connections of the motors and certain of the tube connections;

Fig. 3 shows diagrammatically the primary circuit of a folder motor, the electronic means to be included in the primary circuit of said motor and also control means for such electronic means, and Fig. 4 shows diagrammatically one of the pilot motors and push button control for the electroresponsive switches of one of the control panels, this showing being typical of each of the several control panels.

Referring to Fig. 1, the printing press shown thereby comprises printing units $P^1$, $P^2$, $P^3$, $P^4$ and folders $F^1$, $F^2$. The printing units have single motor drives $M^1$, $M^2$, $M^3$ and $M^4$ individualized thereto, while the folders have individualized thereto single motor drives $M^5$ and $M^6$. The motors are axially alined and are adapted to be mechanically connected through a common shaft 10 comprising a plurality of sections and couplings therefor, preferably mechanical. As is customary, the printing units $P^1$ to $P^4$ and the folders $F^1$, $F^2$ are individually connected to sections of shaft 10 through bevel gear sets 11. The shaft 10 has interposed between motor $M^5$ and the bevel gears 11 of folder $F^1$ a clutch 13 and between said motor and the bevel gears of printing unit $P^1$ a clutch 14. Similar clutches are interposed between each of motors $M^1$, $M^2$, $M^3$ and $M^4$ and the two press units adjacent to each, while a clutch 15 is interposed between motor $M^6$ and the bevel gears of folder $F^2$. Thus as will be apparent, the press units may be interconnected in different groupings. For example, printing units $P^1$ and $P^2$ and folder $F^1$ may be grouped for drive by motors $M^1$, $M^2$ and $M^5$, while the remaining printing units and folder may be grouped for drive by motors $M^3$, $M^4$ and $M^6$. Alternatively it will be apparent that all printing units may be grouped with folder $F^1$ for drive by motors $M^1$, $M^2$, $M^3$, $M^4$ and $M^5$, the folder $F^2$ being disconnected. As will be understood, other groupings may be effected with the number of units shown, whereas the total number of units may be increased or decreased as desired.

The motors $M^1$ to $M^6$ preferably are alike, and preferably are of the polyphase induction type. As indicated in Fig. 1, each motor is provided with an individualized control panel, the control panels $C^1$, $C^2$, $C^3$ and $C^4$ for motors $M^1$, $M^2$, $M^3$ and $M^4$, respectively, being alike, and the control panels $C^5$ and $C^6$ for the motors $M^5$ and $M^6$, respectively, being alike but being somewhat different from panels $C^1$ to $C^4$. All control panels are alike in having a crosshead type speed regulator 20, such speed regulators preferably being alike and collectively having pilot driving motors 21 and 22. Pilot motors 21 and 22 are interconnected by a shaft 23 comprising a plurality of sections and mechanical couplings 24 for said sections, there being a separate section for each speed regulator and a bevel gear connection 25 between each speed regulator and its respective shaft section. The couplings, as will appear, are of sufficient number and are so located as to enable the speed regulators and pilot motors to be grouped correspondingly to the groupings of the printing units and folders of the press. Also all control panels are alike in having two electroresponsive switches 27 and 28 of the triple pole type.

Control panels $C^5$ and $C^6$ additionally comprise electronic equipment including electron tubes 30 and 31, Fig. 1, and other tubes, Fig. 3. Also each such panel comprises two electroresponsive relays 32 and 33 associated with tubes 30 and 31 of the respective panel, each such relay being of the double throw type. Relay 32 has normally engaged contacts $32^a$ to be disengaged when said relay is energized, and normally disengaged contacts $32^b$ to be engaged when said relay is energized, the relay 33 having similar contacts.

Further referring to Fig. 1, relay panels 35 and 36 are provided for control of the pilot motors 21 and 22, respectively, and for control of other of the aforementioned instrumentalities under the control of push button stations. For simplicity of illustration only three such stations 37, 38 and 39 are shown, the stations being alike and comprising stop, inch, on and off push button switches so designated, but as will be understood there would ordinarily be one or more push button stations for each of the printing units and folders. The stations 37 and 38 are coordinated with the folders $F^1$ and $F^2$, while station 39 is representative of the stations individualized to the printing units of the press. Also as will be understood, the relay panels 35 and 36 may have permanent electrical connections with their respective pilot motors 21 and 22, their respective control panels $C^5$, $C^6$ and their respective control stations 37, 38, such connections being represented in Fig. 1 by uninterrupted cables. On the other hand, it will be understood that in view of the aforementioned possible different groupings of the press units and control panels the relay panels require changeable interconnections between one another and between each and all control panels $C^1$ to $C^4$. Likewise the relay panels require changeable interconnections between each of the same and the push button stations represented by the single station 39. Such changeable interconnections are represented by cables comprising sections and suitable electrical couplings 40 for the sections. Of course the couplings 40 may if preferred take the form of switches as in Fig. 2. Current for the motors and all control instrumentalities is supplied from lines $L^1$, $L^2$, $L^3$ and for indication thereof cable connections have been shown as extending from said lines to each of the control panels $C^1$ to $C^6$.

Referring to Fig. 2, it shows diagrammatically the motors $M^1$ to $M^6$ as each having a primary for connection to lines $L^1$, $L^2$, $L^3$ through its respective switch 27 aforementioned and as having secondary connections of which those shown for motor $M^5$ are typical. Motor $M^5$ is shown as having resistors $r^1$, $r^2$ and $r^3$ for the different phases of its secondary circuit, which resistors are under the control of its respective speed regulator 20 here represented by crosshead and driving screw. Also motor $M^5$ is shown as having resistors $r^4$, $r^5$, $r^6$ for the different phases of its secondary circuit, which resistors are used in braking only, being subject to exclusion by the aforementioned switch 28 of the respective control panel.

Also Fig. 2 shows the two sets of electronic tubes 30 and 31 of control panels $C^5$ and $C^6$, the two sets of relays 32 and 33 of said panels and double pole knife switches 50 to 56 providing for different groupings of the driving motors with the motors of each group in a parallel relation. More particularly switches 51 to 55 provide for connecting together sections of a conductor 60, which sections are respectively connected to the center terminals of the motors $M^1$ to $M^6$ and also for connecting together sections of a conductor 61 which are respectively connected to the lowermost terminals of said motors, all of said connections extending through the respective switches 27. Switches 50 and 56 control other connections of the sectional conductors 60 and 61. With switches 50 and 56 closed, conductors 60 and 61 are adapted to be bridged by the normally closed contacts of relays 32 and 33 of panels $C^5$ and $C^6$. Also with switches 50 and 56 closed conductor 60 forms with conductor 66 a loop having a connection to line $L^2$ and with relays 33 energized the bridges of conductors 60 and 61 are interrupted, and conductor 61 forms with conductor 62 a loop having a connection to line $L^3$. Such connections to the supply lines are made through a triple pole knife switch 64, which knife switch connects to line $L^1$ a conductor 65 which has leads to the uppermost primary terminals of motors $M^1$ to $M^6$. With the switches 50 and 56 closed and with the relays 32 energized, but with the relays 33 de-energized, the tubes 30, 31 of panels $C^5$, $C^6$ have a connection by way of conductor 62 to line $L^3$.

With all knife switches of Fig. 2 closed all motors $M^1$ to $M^6$ form a single group to be supplied with power from lines $L^1$, $L^2$, $L^3$ upon closure of switches 27. With relays 32 of panels $C^5$ and C⁶ deenergized but with relays 33 of such panels energized the motors would be connected to the supply lines exclusive of the tubes 30, 31 of both panels. The common feed wire 61 would be connected to conductor 62 and hence to line L³, as above set forth, whereas the common feed wires 60 and 65 would be connected to the other two supply lines, as aforedescribed. On the other hand, with relays 32 of panels C⁵, C⁶ energized and relays 33 deenergized the two sets of tubes 30, 31 would be included in parallel relation in the common connection between the lowermost primary terminals of the motors and line L³, the other motor connections remaining as aforedescribed. Through the medium of the tubes included in one phase of each motor primary circuit slow speed operation of the motors is obtained, as hereinafter more fully set forth, and for such slow speed operation the resistors $r^1$, $r^2$ and $r^3$ are included in the secondary circuits of the motors, whereas the switches 28 are energized to short-circuit resistors $r^4$, $r^5$ and $r^6$. Exclusion of the tubes 30 and 31 from circuit in the manner aforedescribed provides for operation of the motors at running speeds determined by adjustment of the resistors $r^1$, $r^2$ and $r^3$ by the speed regulators 20, the resistors $r^4$, $r^5$, $r^6$ remaining excluded from circuit. When the motors are in operation deenergization of all relays 32, 33 effects through their normally closed contacts bridging of feed wires 60, 61 and hence bridging of two of the primary terminals of each motor for single phase braking action under which conditions the resistors $r^4$, $r^5$, $r^6$ are included in the secondary connections of the motors by opening of switches 28.

Considering a few of the numerous possible groupings afforded by the arrangement shown in Fig. 2, closing of switches 50, 51, 52, 54, 55 and 56 with switch 53 remaining open provides for placing motors M⁵, M¹, M² under the control of panel C⁵, and motors M⁶, M³, M⁴ under the control of panel C⁶, the panels C⁵ and C⁶ being disconnected from one another by the open switch 53. Alternatively any number of the press unit motors might be grouped with folder M⁵ under the control of panel C⁵ by closing switch 50 and an additional switch for each of the grouped press unit motors while leaving switch 56, for example, open to disconnect panel C⁶ from panel C⁵. Similarly the press unit motors might be grouped with folder motor M⁶ under the control of panel C⁶ by closing switch 56 and an additional switch for each of the grouped press unit motors while leaving switch 50 open to disconnect panel C⁵ from panel C⁶. Assuming closure of all knife switches except 52 or 54 one group of motors would comprise one folder motor and one printing unit motor, whereas the other group would comprise one folder motor and three printing unit motors, one group being under the control of panel C⁵ and the other under the control of panel C⁶.

Referring to Fig. 3, it shows in further detail, but without illustration of relays 32 and 33 of Figs. 1 and 2, electronic control means for the folder panels C⁵ and C⁶, such control means being similar to control means disclosed in the aforementioned copending application. Fig. 3 shows control means for panel C⁵ only, it being understood that such control means would be duplicated for panel C⁶ and for each additional folder panel if desired. Inasmuch as Fig. 3 shows control for panel C⁵ the one motor shown in this figure is designated M⁵, the showing of circuits for this motor being limited to those of its primary. As heretofore set forth, the electronic control means will influence not only its respective motor but all motors grouped therewith.

Briefly described, the control shown in Fig. 3 comprises the aforementioned tubes 30 and 31 to be included in circuit between the motor or motors and line L³ and to be controlled for slow constant speed motor operation, as for inching or threading. Tubes 30 and 31 are shown as of the ignitron type, and as will be apparent said tubes are interconnected for discharge alternately to pass both half waves of an alternating current. Such tubes have ignition electrodes 30ᵃ and 31ᵃ, respectively, which are respectively under the influence of thyratron tubes 70 and 71, each of said ignition electrodes being connected through a suitable resistor to the cathode of its respective thyratron tube. The anodes of tubes 31, 70 and 71 are all connected to line L³, as is also the cathode of tube 30, whereas the anode of tube 30 and the cathode of tube 31 have connections leading to the lowermost terminal of motor M⁵ through contacts of switch 27. The cathodes of tubes 70 and 71 are respectively connected to the upper terminals of secondary windings 72 and 73 of a transformer T and the control electrodes of said tubes are respectively connected to the lower terminals of said transformer windings through suitable resistors, a capacitor 75 being preferably connected across the leads to the cathode and control anode of each of said thyratron tubes. The transformer T has a primary winding 74 which has one terminal connected to the center tap of an impedance 76 connected across lines L¹, L³ and which has its other terminal connected to line L³ through the winding 77 of a saturable reactor 78, the last mentioned terminal of winding 74 also having a connection through a suitable resistor to line L¹. This reactor has a saturating winding 79 which is connected across a battery 80 through an electron tube 81 and a suitable resistor. Tube 81 has a control electrode connected to the anode of a tube 82. Tube 82 has its anode connected through a suitable resistor to the positive side of a circuit supplied by a battery 83 and has its cathode connected to the movable contact of a voltage dividing resistor 84 connected across battery 83. The control electrode of tube 82 is connected through a suitable resistor to the anode of a tube 85. Tube 85 has its cathode connected to the negative side of the circuit supplied by battery 83 and has its anode connected to the positive side of said circuit. Also connected across the last mentioned circuit is a voltage dividing resistor 86 which has its adjustable contact connected by down contacts of a relay 88 to the positive side of the armature of a tachometer generator 87 coupled to motor M⁵ to be driven thereby, the negative side of said generator armature being connected through a suitable resistor to the control electrode of tube 85. A second voltage dividing resistor 89 in parallel to resistor 86 is adapted to have its movable contact included in circuit in lieu of the contact of resistor 86 upon response of relay 88.

With the control just described the tubes 30 and 31 in starting of the motor M⁵ from rest will be conducting during substantially their entire respective half cycles, but as the motor sets in motion the tachometer generator the duration of the periods of conduction of said tubes will be decreased, and with the contact of voltage dividing resistor 86 properly adjusted the periods of conduction of said tubes may be so restricted as to hold the motor to a very slow speed. As the motors grouped with motor M⁵ are dependent upon the same source of power their speed will likewise be restricted.

Briefly describing the operation of the control of Fig. 3, conduction of the ignitron tubes 30 and 31 is initiated at the moment when their respective thyratron tubes 70 and 71 become conducting and when starting the motor M⁵ from rest the thyratron tubes will become conducting at the beginning of their respective positive half cycles. This is due to the fact that the current passing through the saturating winding 79 is then at a maximum, with the result that the phase angle between the voltage impressed on tubes 70 and 71 and the voltage induced in windings 72 and 73 due to the voltage obtaining in winding 74 is a minimum. The voltage impressed on the control electrode of tube 85 by the voltage divider 86 is of sufficiently high positive value with respect to the cathode of tube 85 to render said tube highly conducting when no opposing voltage is supplied through the tachometer generator 87 as when the motor M⁵ is at standstill. The high current flowing through tube 85 produces a relatively high voltage drop through the resistor in series therewith so that the tube 82 by virtue of its low grid potential has relatively low conductivity which in turn produces a relatively low potential drop through the resistor in series therewith, wherefore the control electrode of tube 81 is only slightly negative with respect to its cathode, and this in turn causes a relatively high current to flow from the positive terminal of battery 80 through the saturating winding 79 and tube 81 to the negative terminal of said battery. Thus the reactor is highly saturated and the current through the winding 77 is large, thereby affording a voltage in the winding 74 of transformer T and corresponding voltages in the windings 72 and 73 which are substantially in phase with the voltage impressed upon tubes 70 and 71. As the motor starts, the tachometer generator supplies a supplemental voltage to the control electrode of tube 85 which is opposed to the voltage supplied by the voltage dividing resistor 86, with the result that with increase in speed of the motor the tube 85 becomes less conducting, thus increasing the conduction of tube 82, which in turn decreases the conduction of tube 81, and thereby decreases the current in saturating winding 79. This decreases the current in the reactor winding 77, which results in increase of the retardation of the phase angle of the voltages in the windings of transformer T with respect to the voltage of lines L¹, L², L³ and thereby retards the moment of ignition during the respective half cycles of tubes 70 and 71, and this through the tubes 30 and 31 reduces the effective current supplied to one terminal of each of the grouped motors so as to maintain the speed thereof at a low constant value determined by the adjustment of the contact of voltage dividing resistor 86.

As will be apparent, selective predetermined slow speeds may be provided for in various ways as through the medium of the additional voltage dividing resistor 89. The latter resistor may obviously be designed and adjusted for a higher slow speed when its contact is included in circuit in lieu of the contact of resistor 86, and obviously more than two speeds might be provided for in a similar way.

Referring to Fig. 4, it shows control circuits for the electroresponsive switches and relays hereinbefore specified and for additional electroresponsive relays hereinafter enumerated, such circuits being under the control of the push button stations.

Briefly set forth, Fig. 4 shows contacts of one of the speed regulators 20 and one of the pilot motors 21 of Fig. 1, windings for switches 27, 28 of Fig. 1, relays 32, 33 of Fig. 1, relay 88 of Fig. 3, an inch relay 90, an on relay 91, an off relay 92, a stop relay 93, a timing relay 94, and an additional relay 95. The push button switches shown in this figure comprise an inch switch 96, an on switch 97, an off switch 98 and a stop switch 99. The pilot motor 21 is shown as having field windings $f^1$ and $f^2$ to be energized selectively for reverse operations of said motor, which as will be understood from the showing of Fig. 1 effects reverse operations of the crosshead of speed regulator 20. While the resistors $r^1$, $r^2$, $r^3$ of the speed regulator 20 are not shown in Fig. 4 it will be understood that they are arranged to be varied gradually as the crosshead moves along the elongated contacts shown in Fig. 4.

While the control shown in Fig. 4 would in practice ordinarily be supplemented in various respects, including provision of signaling means, means to effect step by step operation of the crosshead of the speed regulator, etc., the showing of Fig. 4 will suffice to afford an understanding of the control of the apparatus hereinbefore described, it being borne in mind that as indicated by the dotted line showing in Fig. 4 of windings of switches 27 and 28, the Fig. 4 control is effective in respect of a single drive or a plurality of drives if grouped together.

Assuming closure of the inch push button switch 96, it connects winding 90ᵃ across lines L¹, L² through an on limit switch 100, which as will be understood is a normally closed switch opened by the speed regulator 20 in its full speed position. Winding 90ᵃ being thus energized, the inch relay responds and its contacts 90ᵇ connect across lines L¹ and L² through a suitable resistor 101 winding 93ᵃ of the stop relay. The stop relay upon responding engages its contacts 93ᵇ to establish for itself a maintaining circuit independent of the inch relay and by engagement of its contacts 93ᶜ completes an across-the-line energizing circuit for one or more resistance controlling switches 28 of Fig. 1 according to the grouping of the press units and controls thereof. Also the stop relay upon responding engages its contacts 93ᵈ to establish for certain windings hereinafter referred to a connection to line L². The inch relay in addition to so energizing the stop relay completes by its contacts 90ᶜ a circuit from line L¹ through contacts of the speed regulator when in the position shown, to and through the winding of one of the relays 32 of Figs. 1 and 2, and thence through contacts 93ᵈ of the stop relay to line L². Relay 32 thus responds to include in circuit in the manner previously explained the ignitron tubes of one of the electronic controls. Additionally the inch relay in responding engages its contacts 90ᵈ to connect across lines L¹, L² winding 94ᵃ of timing relay 94, and the latter relay by engaging its contacts 94ᵇ establishes an across-the-line energizing circuit for one or more of the switches 27 of Fig. 1 according to the grouping of the press units. Thus the driving motors of the press units grouped together will be connected to the power lines and will be held to slow speed by the electronic control, as heretofore explained. On the other hand, the motor or motors will be disconnected from circuit immediately upon release of the inch push button switch 96. Release of push button switch 96 effects release of the inch relay, which in turn deenergizes relay 32, and this, as hereinbefore set forth, interrupts the motor connections to one line of the supply circuit. Stopping of the motor or motors results even though the switch or switches 27 remain closed, and provision is made whereby release of switches 27 is delayed for a transient period to permit of a further inching operation by merely reenergizing the relay 32. As shown, this is accomplished by providing winding 94$^a$ of the timing relay with a shunt including a resistor 102 and a capacitor 103 and by including in series with said winding a rectifier 104. With this arrangement the shunt for winding 94$^a$ affords the relay in a well known manner a time element incident to release and pending release of relay 94 its contact 94$^b$ maintain the energizing circuit of switch or switches 27. Obviously if another inching operation is not initiated within the period required for release of relay 94 said relay releases to deenergize the switch or switches 27 for complete disconnection of the motor or motors from the supply circuit. With the circuit arrangement illustrated the stop relay 93 would remain energized after termination of inching, subject to deenergization by closing of the push button switch 99. This switch, as will be apparent, affords short-circuiting of the winding 93$^a$ at will for release of said relay.

Assuming now that the stop relay is open and that the on push button switch 97 be closed, said switch will connect across lines $L^1$, $L^2$ through the on limit switch 100, the winding 91$^a$ of on relay 91. Relay 91 upon responding engages its contacts 91$^b$ to parallel the maintaining contacts 93$^b$ of the stop relay, thus energizing said relay which again maintains itself through its contacts 93$^b$. Stop relay 93 again engages contacts 93$^c$ to energize the switch or switches 26 and by engaging its contacts 93$^d$ connects across lines $L^1$, $L^2$ winding 95$^a$ of relay 95 through now closed contacts 91$^c$ of off relay 91. Relay 95 thus responds and by engaging its contacts 95$^b$ establishes a maintaining circuit for itself and by engaging its contacts 95$^c$ it parallels contacts 90$^c$ of the inch relay to energize relay 32 for including in circuit the ignitron tubes of the electronic control. Furthermore relay 95 by engaging its contacts 95$^d$ parallels the contacts 90$^d$ of the inch relay to energize the time relay 94 as aforedescribed for energizing switch or switches 27 to complete motor connections for starting. Assuming release of the on push button switch following starting, the controlled motors would, of course, continue to operate at slow speed as for threading, and as heretofore explained the electronic means may be supplemented to afford different slow speeds to be selected at will. As shown, the speed regulator has several positions in which the circuit of winding 32 is maintained energized and such positions of the speed regulator may be utilized to adjust the electronic means for its different predetermined slow speeds. As shown in Fig. 4, the speed regulator 20 when advanced to the second pair of contact buttons completes an across-the-line circuit for the winding of relay 88, which relay as shown in Fig. 3 provides for an adjustment of the slow speed afforded by the electronic means.

The on relay 91 is energized only so long as the on push button switch 97 is held closed and for continuous slow speed operation relay 91 would be energized only momentarily. On the other hand, if energization of relay 91 is continued by hold-down of the push button 97 said relay will effect operation of motor 21 to advance the crosshead of the speed regulator 20 to the right. More particularly, the relay 91 through its contacts 91$^d$ completes a circuit from line $L^1$ to and through the now closed contacts 95$^e$ of relay 95, to and through the winding $f^1$ and armature $a$ of motor 21 to line $L^2$. Then if the crosshead be advanced to the right beyond the contact buttons to which the winding of relay 32 is connected, said relay is deenergized to disconnect from circuit the electronic control, whereas the winding of relay 33 of Figs. 1 and 2 is energized to establish a direct connection between the controlled motors and line $L^3$, as heretofore explained. The energizing circuit of relay 33 extends from line $L^1$ through the speed regulator to and through the winding of said relay and through contacts 93$^d$ of the stop relay to line $L^2$. The controlled motor or motors will then operate at an increased speed determined by the adjustment of the motor secondary resistors $r^1$, $r^2$, $r^3$. By continued depression of the on push button switch 97, relay 91 may be maintained energized for operation of the speed regulator to cut out any amount or all of the motor secondary resistors $r^1$, $r^2$, $r^3$ according to the motor speed desired. When the speed regulator reaches full speed position it opens on limit switch 100 which deenergizes the on relay.

Speed reduction following establishment of a high speed may be obtained at any time by closing the off push button switch 98 which completes circuit from line $L^1$ through contacts 33$^c$ of relay 33, to and through the winding 92$^a$ of off relay 92, to and through an off limit switch 105 to line $L^2$, said limit switch being one which is opened in the off position of the speed regulator. Energization of winding 92$^a$ effects response of relay 92 which through its contacts 92$^b$ completes for motor 21 a circuit including its reverse field winding $f^2$ whereby the motor drives the crosshead to the left. This reduces the motor speed to a value determined by the length of time push button switch 98 is held depressed, said switch when released deenergizing relay 92 to arrest the speed regulator.

When the motor is running stopping may be effected at any time by depressing the push button switch 99 which deenergizes the stop relay, as aforedescribed. Deenergization of the stop relay deenergizes the other relays including relays 32 and 33, whichever is at the moment energized, and when relays 32 and 33 are both released their down contacts bridge two of the motor terminals, as heretofore explained. Also as heretofore explained, release of the switches 27 is subject to a time delay afforded by relay 94 and thus the motor or motors remain connected to two lines of the supply circuit for a transient period with two primary terminals bridged, whereby single phase braking action is obtained for the controlled motor or motors.

What we claim as new and desire to secure by Letters Patent is:

1. In combination, a plurality of like polyphase induction motors individually to drive units of a machine, interconnections between said motors to restrict the same to operation as a group, slow speed control means for said motors comprising means driven by certain of the grouped motors to produce voltage variable with the speed thereof and comprising means to effect voltage unbalance of the primaries of said motors variable under the influence of such variable voltage, and control means optionally to effect operation of the grouped motors at any of a number of running speeds.

2. In combination, a plurality of like polyphase induction motors individually to drive units of a machine, interconnections between said motors restricting the same to operation as a group, means driven by certain of the grouped motors to produce voltage variable with the speed thereof, and slow speed control means for the grouped motors comprising electronic means under the influence of said variable voltage and effective for varying voltage unbalance of the primaries of the grouped motors, and control means optionally to effect operation of the grouped motors at any of a number of running speeds.

3. In combination, a plurality of like polyphase induction motors individually to drive units of a machine, interconnections between said motors restricting the same to operation as a group, means driven by one of said motors to produce voltage variable with the speed thereof, and slow speed control means for said motors comprising means under the influence of such voltage and being common to said one motor and the motors grouped therewith to effect varying voltage unbalance of the primaries of such grouped motors.

4. In combination, a plurality of like polyphase induction motors individually to drive units of a machine, a polyphase supply circuit, means to connect the primaries of said motors in parallel to said supply circuit, means driven by one of said motors to produce voltage variable with the speed thereof, and control means for said motors comprising electronic means under the influence of said variable voltage and further comprising means for including part of said electronic means in circuit between one line of said supply circuit and one primary terminal of each of said parallel connected motors for slow speed and for excluding the same from circuit for running speeds.

5. In combination, a plurality of polyphase induction motors individually to drive units of a machine, a polyphase supply circuit, means to mechanically interconnct with a given one of said motors a varying number of the other of said motors, means driven by said one motor to produce voltage variable with the speed thereof, means under the influence of said variable voltage to be used to effect voltage unbalance of the primaries of the interconnected motors and means to connect the primaries of such interconnected motors to said power circuit in parallel, selectively with or without inclusion of the third mentioned means in circuit between one primary terminal of each of said parallel connected motors and one line of said supply circuit.

6. In combination, a plurality of induction motors individually to drive units of a machine, a polyphase supply circuit, means to mechanically interconnect with a given one of said motors a varying number of the other of said motors, means driven by said one motor to produce voltage variable with the speed thereof, electronic means under the influence of said variable voltage and means to connect the primaries of such interconnected motors to said power circuit in parallel, selectively with or without inclusion of part of said electronic means between one primary terminal of each of said parallel connected motors and one line of said supply circuit.

7. In combination, a plurality of three phase induction motors individually to drive units of a machine, a polyphase supply circuit, interconnections between said motors to restrict the same to operation as a group, means to connect said motors to said supply circuit and to effect selectively slow or high speed operation thereof, said means connecting the terminals of said motors in parallel to said supply circuit and providing for disconnecting one primary terminal of each of said motors from said supply circuit while maintaining connections between the other primary terminals of each motor and said supply circuit, and means which for braking while said motors remain so connected bridges the disconnected terminal of each motor with one of the other terminals thereof.

8. In combination, a plurality of three phase induction motors individually to drive units of a machine, a polyphase supply circuit, interconnections between said motors to restrict the same to operation as a group, means to connect said motors to said supply circuit and to effect selectively slow or high speed operation thereof, said means connecting the primaries of said motors in parallel to said supply circuit and providing for disconnecting one primary terminal of each of said motors from said supply circuit while maintaining connections between the other primary terminals of each motor and said supply circuit, and means to effect single phase braking action by said motors while remaining so connected, the last mentioned means including means to bridge the disconnected terminal of each motor with one of the other terminals thereof and also including means to increase by a given amount the resistance of the secondary circuit of each motor.

9. In combination, a plurality of three phase induction motors individually to drive units of a machine, a three phase supply circuit, interconnections between said motors to restrict the same to operation as a group, means to connect said motors to said supply circuit and to effect selectively slow or high speed operation thereof, said means connecting the primaries of said motors in parallel to said supply circuit and providing for disconnecting one primary terminal of each motor from said supply circuit while maintaining connections between the other primary terminals of each motor and said supply circuit, and means which for braking while said motors remain so connected bridges the disconnected terminal of each motor with one of the other terminals thereof, said interconnections and said means being commutatable for rendering certain of said motors free of the others and of the control of the latter.

10. In combination, a plurality of three phase induction motors individually to drive units of a machine, a three phase supply circuit, interconnections between said motors to restrict the same to operation as a group, means to connect said motors to said supply circuit and to effect selectively slow or high speed operation thereof, said means connecting the primaries of said motors in parallel to said supply circuit and providing for disconnecting one primary terminal of each motor from said supply circuit while maintaining connections between the other primary terminals of each motor and said supply circuit, and means which for braking while said motors remain so connected bridges the disconnected terminal of each motor with one of the other terminals thereof, said interconnections and said means being commutatable to divide said motors into a plurality of groups independently controllable or being controllable in the manner set forth.

11. In combination, a three phase induction motor, a three phase supply circuit therefor, means to connect all the primary terminals of said motor to their respective lines of said supply circuit for power operation and in stopping said motor first disconnecting one terminal thereof and then disconnecting its remaining terminals, said means including means affording a given time interval between such disconnecting steps, and means to bridge the disconnected terminal with one of the other terminals throughout such time interval.

12. In combination, a three phase induction motor, a three phase supply circuit therefor, means to connect all the primary terminals of said motor to their respective lines of said supply circuit for power operation and in stopping said motor first disconnecting one terminal thereof and increasing the resistance of the secondary circuit of said motor and then disconnecting the remainder of said motor terminals, said means including means affording a given time interval between such disconnecting steps and means to bridge the disconnected terminal with one of the other terminals throughout such time interval.

13. In combination, a three phase induction motor, a three phase supply circuit, means controlling the connections between the primary terminals of said motor and said supply circuit and comprising two switches to be operated selectively to establish different circuits between a given primary terminal and said supply circuit, said switches when in their respective normal position interrupting both of said circuits, means included in one of said circuits to effect voltage unbalance of the motor primary, the other of said circuits being a direct connection from said given terminal to said supply circuit, and a bridging circuit for said given terminal and another of said terminals completed by said switches jointly when in their respective normal positions.

14. In combination, a plurality of three phase induction motors, a three phase supply circuit, means to connect in parallel to said supply circuit the primary terminals of a varying number of said motors, said means comprising two selectively operable switches for establishing selectively different circuits between a given terminal of each of said motors and one line of said supply circuit, one of said circuits constituting a direct connection, means included in the other of said circuits to effect voltage unbalance of the primaries of said motors, said switches when in their respective normal positions interrupting both of the aforementioned circuits and circuit connections established by said two switches when in their respective normal positions, which last named circuit bridges said given terminal of each motor with a second terminal thereof.

15. In combination, a plurality of three phase induction motors, a three phase supply circuit, means to connect in parallel to said supply circuit the primary terminals of a varying number of said motors, said means comprising two selectively operable switches for establishing selectively different circuits between a given terminal of each of said motors and one line of said supply circuit, one of said circuits constituting a direct connection, means included in the other of said circuits to effect unbalance of the primaries of said motors, said switches when in their respective normal positions interrupting both of the aforementioned circuits and circuit connections established by said two switches when in their respective normal positions, which last named circuit bridges said given terminal of each motor with a second terminal thereof, said first mentioned means in effecting disconnection of said motors for stopping first effecting disconnection of said given terminal of each motor and then effecting disconnection of the other terminals thereof and comprising means insuring a given time interval between such disconnecting steps.

16. In combination, a plurality of printing units, a plurality of folders, commutatable mechanical couplings for said units and folders, individual driving motors of the polyphase slip ring type for said units and folders, a polyphase supply circuit and control means for said motors commutatable for group control of said motors according to the commutations of said mechanical couplings, said control means comprising in association with each folder, means to establish for the respective folder motor and the unit motor or motors grouped therewith slow speed primary connections to said supply circuit.

17. In combination, a plurality of printing units, a plurality of folders, commutatable mechanical couplings for said units and folders, individual driving motors of the polyphase slip ring type for said units and folders, a polyphase supply circuit and control means for said motors commutatable for group control of said motors according to the commutations of said mechanical couplings, said control means comprising in association with each folder, means to establish for the respective folder motor and the unit motor or motors grouped therewith slow speed primary connections to said supply circuit including means to effect voltage unbalance of the motor primaries.

18. In combination, a plurality of printing units, a plurality of folders, commutatable mechanical couplings for said units and folders, individual driving motors of the polyphase slip ring type for said units and folders, a polyphase supply circuit and control means for said motors commutatable for group control of said motors according to the commutations of said mechanical couplings, said control means comprising in association with each folder means to establish for the respective folder motor and the unit motor or motors grouped therewith slow speed or high speed primary connections to said supply circuit, the slow speed connections including means to effect voltage unbalance of the motor primary, and said means associated with each folder further comprising means to establish for the grouped motors primary connections to the line for single phase braking action of said motors.

19. In combination, an induction motor, an alternating current supply circuit, means for inclusion in circuit between the primary of said motor and said supply circuit for limiting said motor to inching speed, a main switch and a slow speed switch for jointly completing the motor primary circuit inclusive of said means, the latter switch being operable to stop said motor while said main switch remains closed, control means for said switches comprising to effect closing and opening thereof an inch switch, and further comprising a time element device to delay opening of said main switch in response to said inch switch, thereby to provide a period in which another inching operation may be initiated by reclosure of said slow speed switch, and means which together with said main switch provide selectively for power operation of said motor with said speed limiting means excluded from circuit or for connections rendering said motor self-braking for a transient period determined by said time element device.

20. In combination, an induction motor, an alternating current supply circuit, means for inclusion in circuit between the primary of said motor and said supply circuit for limiting said motor to inching speed, a main switch and a slow speed switch for jointly completing the motor primary circuit inclusive of said means, the latter switch being operable to stop said motor while said main switch remains closed, control means for said switches comprising to effect closing and opening thereof an inch switch and further comprising a time element device to delay opening of said main switch in response to said inch switch, thereby to provide a period in which another inching operation may be initiated by reclosure of said slow speed switch, and means which together with said main switch provide selectively for power operation of said motor with said speed limiting means excluded from circuit or for braking connections for the primary of said motor, said braking connections bridging certain terminals of the motor primary and connecting certain terminals of the motor primary to said supply circuit, the latter of said braking connections being subject to interruption automatically by said main switch under control by said time element device.

WILLIAM H. ELLIOT.
CYRIL P. FELDHAUSEN.